United States Patent [19]
Ohba et al.

[11] Patent Number: 5,091,710
[45] Date of Patent: Feb. 25, 1992

[54] STEP LINEAR ACTUATOR

[75] Inventors: Souji Ohba, Hirakata; Ryota Shimizu, Toyonaka; Hideki Ohura, Matsuyama, all of Japan

[73] Assignee: Matsushita Electric Industrial Co., Ltd., Osaka, Japan

[21] Appl. No.: 384,764

[22] Filed: Jul. 25, 1989

[30] Foreign Application Priority Data

Jul. 28, 1988 [JP] Japan ............................ 63-189011
Mar. 22, 1989 [JP] Japan ............................ 1-69601
Mar. 22, 1989 [JP] Japan ............................ 1-69602

[51] Int. Cl.$^5$ ........................................... H01F 7/00
[52] U.S. Cl. ............................ 335/229; 335/232
[58] Field of Search ........................ 335/230–234, 335/229

[56] References Cited

U.S. PATENT DOCUMENTS

| | | | |
|---|---|---|---|
| 4,609,899 | 9/1986 | Koehler | 335/230 |
| 4,697,164 | 9/1987 | Eilertsen . | |
| 4,717,900 | 1/1988 | Iwasaki . | |
| 4,730,175 | 3/1988 | Ichikawa et al. | 335/234 |
| 4,797,645 | 1/1989 | Uetsuhara . | |

FOREIGN PATENT DOCUMENTS 59-67881  4/1984  Japan .

OTHER PUBLICATIONS

"Linear Step Motor Design Provides High Plotter Performance at Low Cost"; Tsai et al.; H. P. Journal, 1979.

Primary Examiner—Leo P. Picard
Assistant Examiner—Lincoln Donovan
Attorney, Agent, or Firm—Wenderoth, Lind & Ponack

[57] ABSTRACT

A step linear actuator includes a stationary member of a magnetic material, a pair of moving units each being in contact with the stationary member and having a magnetic coupling element for magnetically generating a contact force to the stationary member and an opposing face opposing to the opposing face of the other moving unit through a gap therebetween, and a magnetic driver for generating magnetic forces to control the contract force between each moving unit and the stationary member and to cause a relative movement of the pair of moving units with respect to each other.

23 Claims, 9 Drawing Sheets

STEP LINEAR ACTUATOR

BACKGROUND OF THE INVENTION

1. Field of the Invention

The present invention relates to a step linear actuator which effects linear motion using on electromechanical conversion means.

2. Description of the Prior Art

Hitherto there has generally been available a method of converting a rotary motion into a linear motion using a conversion mechanism such as a ball screw, rack and pinion, etc. For the motor a rotary motion, as shown in the optical pickup traverse means of an optical disk drive for reproducing recorded information from a disk type recording medium having, for example, a spirally recorded information track.

Futhermore, as a means of directly driving a driven member without using the above conversion mechanism, a linear motor or a linear pulse motor is known. These driving apparatuses are composed of a stator comprising mainly magnetic materials and forming a traveling path and a mover disposed opposite to said stator in a slight gap.

For example, an seen in the case of the linear pulse motor (L. Tsai; Design provides High Plotter performance at Low Cost H. P. Journal 1979-2), the above stator is composed of magnetic pole teeth of a certain pitch, and the mover is composed of a pair of yokes having different pitches from that of the magnetic pole teeth of the stator and holding a permanent magnet therebetween and a pair of the electromagnetic coils wound on the yokes. The mover is displaced stepwise to the stator by alternate excitation of the electromagnetic coils.

As such, as a means of linear driving, the method of using a transform mechanism or the method of direct drive has so far been known. Either of these methods has complicated construction of traveling path and requires a large occupying area, so it has a limit in obtaining an effective stroke.

According to these constructions, because the mover is caused to travel via a certain small gap from the stator, high accuracy is demanded of both the whole stator and the mover, leading to an increase in the production cost.

Futhermore, the suspension of the mover makes it difficult to keep stability to the traveling path due to the vibration and impact exerted from the exterior of the apparatus and the positional condition.

On the other hand, there has been proposed a method as shown in U.S. Pat. No. 4,697,164 as another direct drive different from the direct drive as in the above linear motor. This construction comprises a pair of stators coaxially mounted on a shaft and spaced from each other in the axial direction of the shaft, a pair of armatures freely slidably supported by the shaft relative to said stators, a pair of latching means each having a center opening surrounding said shaft and being rotatably connected to said armatures at its end, and a spring means disposed between said stators and the armatures for urging the armatures away from the stators. By alternately exciting a pair of electromagnetic coils contained in the stators, the armatures are attracted to the stator side against the pressing force of the spring means, and, in collaboration with said armatures, the latching means on the disk performs pivotal movement at the fulcrum of pivotal movement at its end, so that the shaft is gripped with said center opening, by which linear movement is performed.

This construction necessitates a mechanical grip means besides the electromagnetically operating means, requiring a large number of components with increase in size and cost, and further, due to mechanical grip of the shaft, wear occurs, thereby providing problems in reliability and precision of the apparatus.

Further, according to this construction, because the armatures are at all times attracted to the stator side against the pressing force of the spring means, the energy to be applied becomes large in obtaining an effective driving force against the driven member.

SUMMARY OF THE INVENTION

An object of the present invention is to provide a linear actuator which can be constructed easily in a small size at a reduced cost, and has high productivity.

In order to attain the above object, a linear actuator of the present invention comprises: a stationary member composed of a magnetic material and having a traveling path; first and second moving units which are supported in contact with said stationary member by respective magnetic coupling means and which face each other at respective opposing faces displaceably relative to each other in a prescribed stroke; and a magnetic dirve means which cooperates with said first and second moving units for generating an electromagnetic force at the opposing faces to move one of said first and second moving units.

By means of the above construction, the first and second moving units are at all times magnetically coupled with the stationary member by magnetic fluxes formed by the magnetic coupling means while no electric current is flowing. A magnetic flux path is so constructed that, by letting an electric current flow through the magnetic drive means, an electromagnetic force is generated between the opposing faces to cause a relative displacement of the first and second moving units in the attracting direction at a prescribed stroke, and that the magnetic flux for generating the electromagnetic force flows beteen the respective moving units and the stationary member to overlap the magnetic flux of the magnetic coupling means at the contact part of each moving unit with the stationary member so that the magnetic coupling force with the stationary member either increases or descreases. Accordingly, by changing the direction and amount of the current flowing through the electromagnetic coil, each contact force of the first and second moving units with the stationary member is selectively controlled such that the contact force of the one unit is increased in the more strengthening direction and the contact force of the other unit is decreased in the more weakening direction so that one of the moving units is held stationary on the stationary member and the other makes a step movement by the electromagnetic force acting between the opposing faces of the moving units.

In one preferable construction, the first moving unit has opposing faces at opposite sides in the moving direction of the moving units, and the second moving unit has opposing faces opposing the opposing faces of the first moving unit to form first and second gaps at opposite sides in the moving direction of the moving units. First and second electromagnetic means are provided for generating magnetic fluxes passing through the first and second gaps, respectively. By alternately energizing the first and second electromagnetic means, the contact forces of the respective moving units to the stationary member and magnetic forces at the respective gaps are selectively controlled to cause the relative step movement cycle of the moving units to be repeated continuously, thereby advancing continuously in one direction. The actuator can be moved in the reverse direction by reversing the current flow in each electromagnetic means.

As described above, different from the conventionally known method of linear drive, according to the present construction, each moving unit is at all times stably carried in contat with the stationary member by the magnetic coupling means of simple construction such as a permanent magnet, and moreover, all the drive members allowing one to obtain relatively the prescribed stroke are housed in the first and second moving units, without necessitating any special rail such as projected magnetic pole teeth on the stationary member which forms a traveling path. Accordingly, a simple, compact drive apparatus having as a whole a small number of parts can be realized.

Further, as it is possible to simplify the suspension of the moving unit with respect to the stationary member and to perform stepping in high precision by means of a pulse input signal, the cost of the whole apparatus can be low, so that the linear actuator has high productivity.

BRIEF DESCRIPTION OF THE DRAWINGS

FIG. 2a and FIG. 2b are each a side sectional views taken along 2A—2B in FIG. 3a;

FIG. 3a and FIG. 3b are each a side sectional views taken along 3A—2B and FIG. 2a;

DESCRIPTION OF THE PREFERRED EMBODIMENTS

Figure 1:
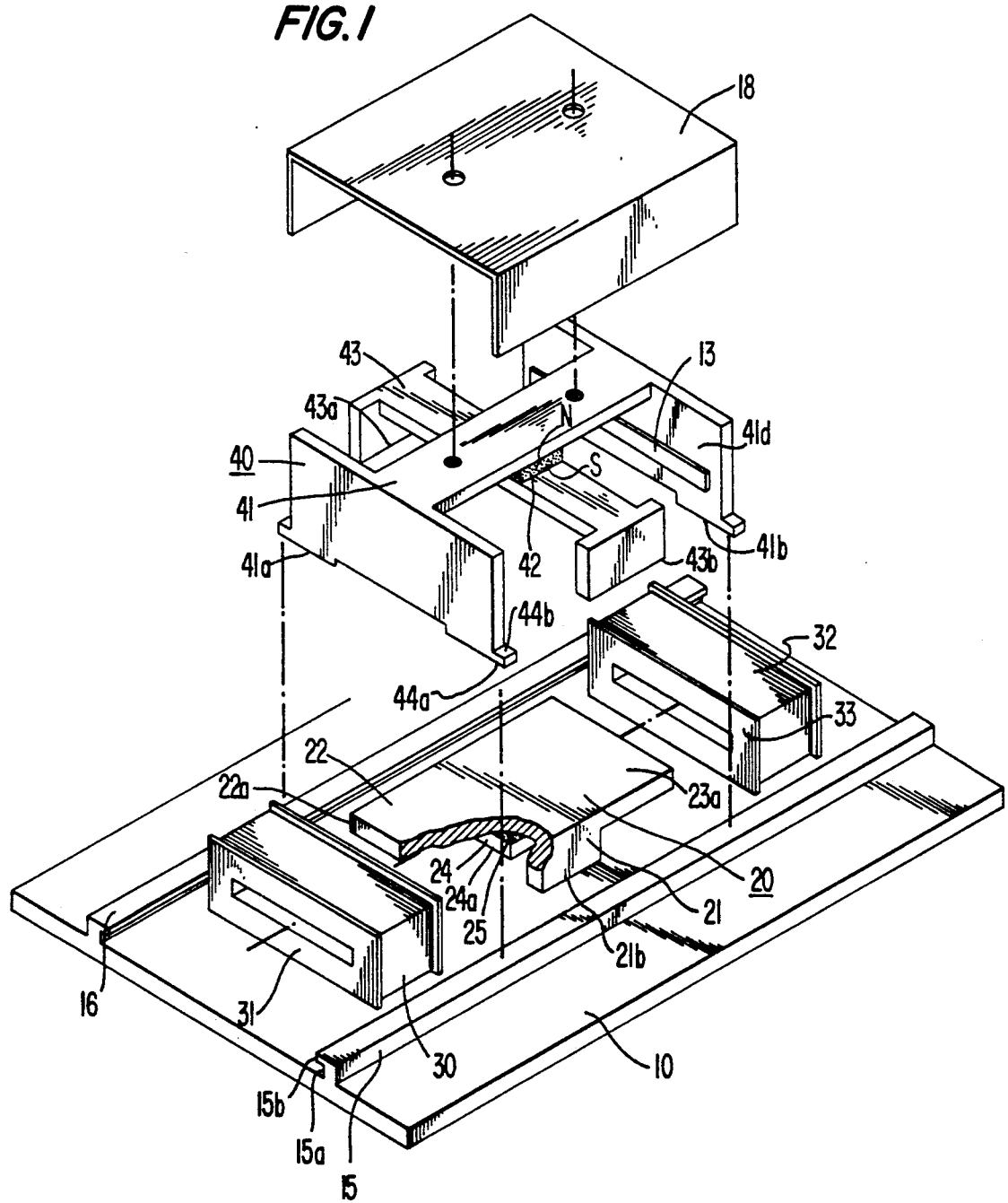
FIG. 1 is a disassembled perspective view of a step linear actuator according to a first embodiment of the present invention.

FIGS. 1, 2a-2b and 3a-3b show a step linear actuator according to a first embodiment of the present invention. The linear actuator comprises a stationary baseplate 10 and a pair of moving units 20 and 40 which are in contact with said baseplate and are relatively freely displaceable at a prescribed stroke in the direction of advance to each other. The moving unit 20 has a one-side opened square shaped yoke 21 which is in contact with the stationary baseplate 10 in a positional relationship of crossing at right angles therewith at a pair of contact faces 21a and 21b, a yoke 24 which oppose at an end face 24a thereof to the stationary baseplate 10 via a certain gap therebetween at about the middle between said contact faces 21a and 21b, and a permanent magnet 25 which is clamped at two end faces thereof having different magnetic poles by said yokes 21 and 24 at about the central lower part of the yoke 21. With said permanent magnet 25 utilized as a source of a magnetomotive force, a magnetic flux path is formed so that a constant magnetic flux is passed through the yoke 21, contact faces 21a and 21b, stationary baseplate 10, the gap between the stationary baseplate 10 and the yoke end face 24a, and the yoke 24.

On the other hand, the moving unit 40 has a one-side opened square shaped yoke 41 having contact faces 41a and 41b which are in contact with the stationary baseplate 10 in the direction of advance, a one-side opened square shaped yoke 43 having two end faces 43a and 43b which are disposed symmetrically and at right angles with the contact faces 41a and 41b and each of which opposes via a certain gap to the stationary baseplate 10, and a permanent magnet 42 which is clamped at two end faces thereof having different magnetic poles by said yokes 41 and 43 at around the central lower part of the yoke 43. With said permanent magnet 42 utilized as a source of a magnetomotive force, a magnetic flux path is formed so that a constant magnetic flux is passed to the yoke 43 through the yoke 41, contact faces 41a and 41b, and the gaps between the stationary baseplate 10 and the yoke end faces 43a and 43b.

Accordingly, the yokes and the stationary baseplate 10 which form the magnetic flux paths of the respective moving units 20 and 40 are mainly composed of a magnetic material comprising a low-carbon steel, and the permanent magnets 25 and 42 are magnetized so that the same magnetic poles are formed at the yoke end face 24a of the moving unit 20 and the yoke end faces 43a and 43b of the moving unit 40. The permanent magnets, the yokes and the stationary baseplate constitute a magnetic coupling means.

Between the moving units 20 and 40, there are provided yokes 22 and 23 coupled with the yoke 21 each having a square section. The yokes 22 and 23 are prrojecting in parallel with the stationary baseplate 10 in bi-directions respectively along the direction of advance, centering on the contact faces 21a and 21b of the moving unit 20, and oppose through a slight gap to the inner face 41c of the yoke 41 which is vertically positioned to the stationary baseplate 10 at its one yoke end face 22a and to the inner face 41d at its another yoke end 23a, thereby constituting respective opposing faces of the moving units 20 and 40.

On the other hand, to the projecting yokes 22 and 23 of the moving unit 20, there are fitted a pair of electromagnetic coils 30 and 32 wound on coil bobbins 31 and 32 formed of resin molding having a square center opening. With the electromagnetic coils 30 and 32 utilized as sources of magnetomotive forces, for example, assuming the electro-magnetic coil 30 to be a source of a magnetomotive force, a magnetic flux path is formed such that a constant magnetic flux flows to the yoke 41, contact faces 41a and 41b, stationary baseplate 10, contact faces 21a and 21b and yoke 21 through a gap between the yoke end face 22a and the yoke 41c. By this magnetic flux, an electromagnetic force is generated between the respective opposing faces 22a and 41c of the moving units 20 and 40 and between the opposing faces 23a and 41d, so that the moving units 20 and 40 are relatively displaced with respect to each other in the direction of attraction.

In the present embodiment, each yoke forming the magnetic flux path and the electromagnetic coils 30 and 32 constitute a magnetic drive means.

The stationary baseplate 10 is fixed to an apparatus body which utilizes the linear actuator of the present embodiment as a drive device. In order to guide the moving units 20 and 40 along the direction of advance on its flat baseplate it has the guide members 15 and 16 which are formed integrally with the baseplate 10 in a parallel relationship with respect to each other. The guide member 15 has a guide face 15a which is perpendicular to the surface of the stationary baseplate 10 and a control face 15b which is parallel therewith. The guide face 15a guides the lower side face 44a of the yoke 41 of the moving unit 40. The guide face 15b is disposed opposite to the upper face 44b of the lower part of the yoke 41. By this, control is made such that the moving unit 40 is not released from the stationary baseplate 10. Similarly, the guide member 16 also guides the lower side face of the moving unit 40.

On the upper face of the central part of the yoke 41 of the moving unit 40, a casing 18 formed of a non-magnetic member may be fixed to surround each of the moving units 20 and 40, and a driven member (not shown) may be fixed to a part of the casing 18.

Figure 12:
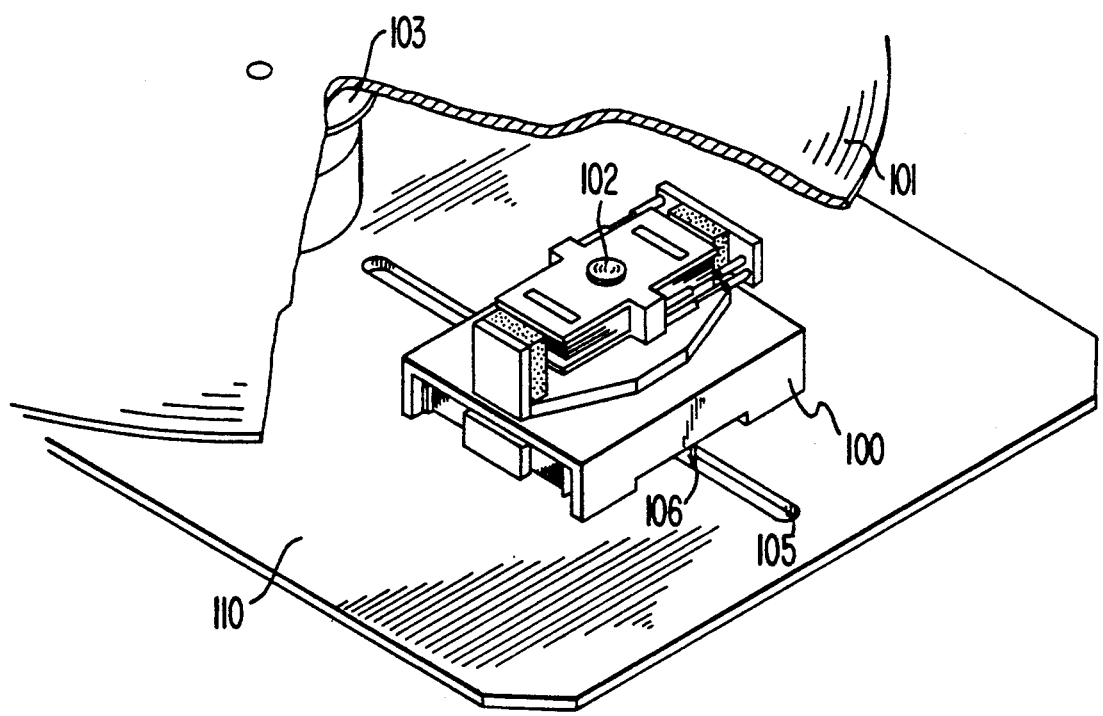
FIG. 12 is a perspective view of an optical pickup traverse means made by application of a step linear actuator according to the first embodiment of the present invention.

As a guide member, besides the construction of the guide members 15 and 16, arrangement may be made such that, as shown in FIG. 12, a groove 105 is provided direct in the direction of advance to the stationary baseplate 110, and guide pins 106 for guiding are provided from the end faces 41a and 41b of the moving unit 40 so as to fit in the groove 105, so as to guide freely slidably along the groove 105.

Alternatively, instead of the stationary baseplate 10, a stationary baseplate may be comprised by a resin molded plate having provided thereon plate-shaped magnetic materials each having a width corresponding to the width of each of the yoke contact faces 41a and 41b of the moving unit 40 to constitute a simple traveling path. By co-using the baseplate of the apparatus body as the stationary baseplate, the whole apparatus may be more simplified, Furthermore, by forming the guide members 15 and 16 not into straight lines but the curved lines, which form a desire curved moving path rather into moving unit can be freely driven to move in the desired moving path along the curved guide members on the stationary baseplate 10.

In the step linear actuator constructed as above, the motion thereof is described with reference to FIG. 2a, FIG. 2b, FIG. 3a, and FIG. 3b.

Figure 2A:
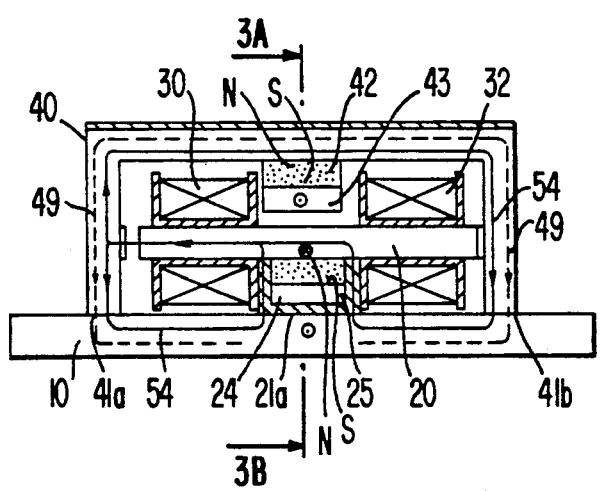
Figure 3A:
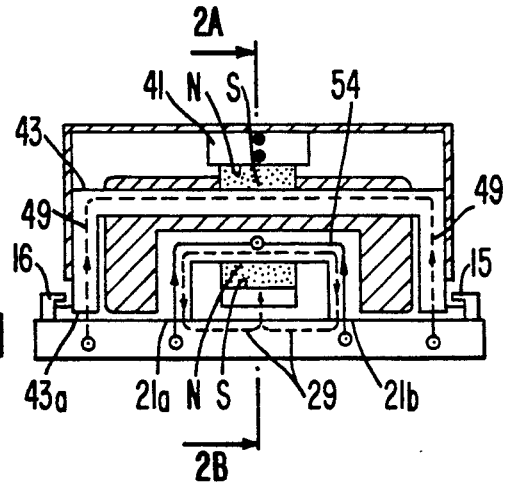

In FIG. 2a and FIG. 3a, when no current flows in the electromagnetic coils 30 and 32, magnetic fluxes 29 and 49 flow in the direction of the dash line along the aforementioned magnetic flux path by way of the permanent magnets 25 and 42, and by said magnetic fluxes 29 and 49, magnetic attractive forces are produced at the respective contact faces 21a and 21b of the yoke 21 and contact faces 41a and 41b of the yoke 41, by which the yokes 21 and 41 are in the condition of constantly being magnetically self-held against the stationary baseplate 10.

Similarly, magnetic forces are produced through a certain gap at the end face 24a of the yoke and the yoke end faces 43a and 43b of yoke 43. By setting the areas of the yoke end face 24a to the contact faces 21a and 21b in such manner as to make the areas of one side yoke end faces 43a and 43b larger than the contact faces 41a and 41b, the effect of the magnetic force at the gap can be minimized.

Then, by letting a current flow through the electromagnetic coil 30 so that a magnetic flux 54 flows in the direction of the solid lines as shown in FIG. 2a and FIG. 3a along the aforementioned magnetic flux path, the magnetic flux 54 overlaps the magnetic fluxes 29 and 49 produced by the permanent magnets 25 and 42 at the contact faces 21a and 21b of the moving unit 20 and at the contact faces 41a and 41b of the moving unit 40. Thus, the magnetic fluxes increase at the contact faces 41a and 41b, so that the contact force of the moving unit 40 to the stationary baseplate 10 is increased more than in the case of the non-flow of current. On the contrary, the magnetic fluxes at the contact faces 21a and 21b decrease, so that the contact force of the moving unit 20 to the stationary baseplate 10 decreases. Further, by the magnetic flux, an electromagnetic force is produced between the yoke end face 22a and the opposed yoke 41c.

Figure 2B:
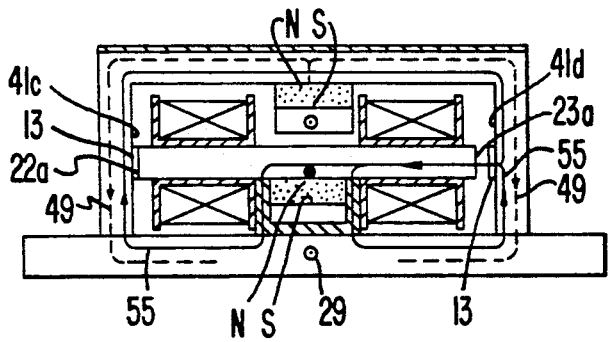
Figure 3B:
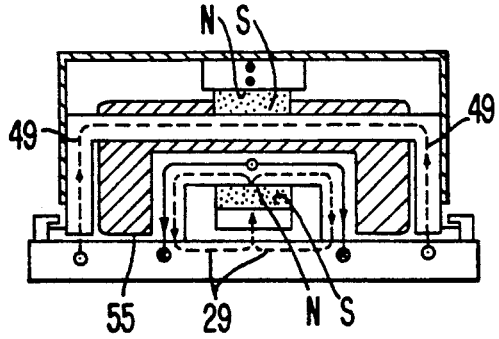

Accordingly, by setting the amount of the current flowing in the electromagnetic coil 30 to a condition in which the magnetic fluxes are substantially cancelled in the vicinity of the contact faces 21a and 21b, i.e., to a condition in which the magnetic potential becomes nearly zero, the moving unit 20 is displaced in the direction of reducing the gap between the inner face 41c of the yoke 41 and the end face 22a of the yoke 22 along the guide members 15 and 16 under the condition of the yoke 41 being held by the stationary baseplate 10. By intercepting the current flowing through the electromagnetic coil 30, the moving units 20 and 40 become the self-held condition to the stationary baseplate 10 in the positional relationship as shown in FIG. 2b and FIG. 3b.

Next, by letting the current flow through the electromagnetic coil 32 so that the magnetic flux 55 flows in the direction of the solid line, reverse to the above, the moving unit 20 is held to the stationary baseplate 10 and the moving unit 40 comes to be in freely displaceable condition. Due to the electromagnetic force formed on the opposing faces 23a and 41d of the yokes 23 and 41, the moving unit 40 is displaced in the direction of decreasing the gap between the opposing faces 23a and 4d thereof. By intercepting the current flowing through the electromagnetic coil 32, the moving unit 40 having been displaced in the direction of advance on the stationary baseplate 10 by the effective gap between the opposing faces 23a and 41d is self-held in the initial relative relationship as shown in FIG. 2a and FIG. 3a.

The abovementioned motions constitute one cycle motion of this step linear actuator. Similarly, by letting the current flow alternately through the electromagnetic coils 30 and 32, the moving units 20 and 40 continuously perform the step motions, and by controlling the pulse input signal for letting the current flow through the electromagnetic coils 30 and 32, an optional stroke can be obtained.

Between the opposing faces 22a and 41c and the opposing faces 23a and 41d, there may be provided thin resin sheet spacers 13 which perform adjustments of the displacement amount, in which the moving units 20 and 40 relatively displace in the gap of the opposing faces. Further, by providing a certain clearance in the condition of contact of the opposing faces, it alleviates the residual magnetism of the yoke formed by alternate current flowing through the electromagnetic coils and acts to mitigate the sound of collision at the opposing faces.

With respect to the characteristics demanded of the linear actuator, there is necessitated such construction as to make the size of the apparatus and the power consumption to the minimum and to exhibit the performance to the maximum extent. In this embodiment, the velocity load characteristic, which is one of the measure of said performance, cna be determined by the stepping amount in one cycle drive, and the number of input pulses per unit time which is set by the magnetic force proportional to the square of the magnetic flux between the opposing faces 22a and 41c and the opposing faces 23a and 41d and inversely proportional to the opposing face area, and the respective masses of the moving units 20 and 40. The magnetic flux at the opposing faces, which is one of the parameters, is determined by the magnetomotive force of the electromagnetic coils 30 and 32 and the magnetic reluctance of the gap in said magnetic flux path, mainly at the opposing faces. Further, in order to obtain more efficient driving, it is necessary to set the magnetic flux to nearly the same extent as that formed by the permanent magnets 25 and 42 and not to cause magnetic saturation at the overlapping of the magnetic fluxes at the contact faces 41a and 41b and 21a and 21b in driving, and to make consideration so that, of the holding forces at the contact faces, the component in the direction of advance should necessarily be larger than the magnetic force at the opposing faces.

Next, a description follows for the case where linear motion is made in the direction opposite to the above direction of advance. In FIG. 2a and FIG. 3a, by letting the current flow through the electromagnetic coil 30 so that the magnetic flux (not illustrated) flows in the direction opposite to the direction of advance, the holding force at the contact faces 21a and 21b is strengthened and on the contrary the holding force at the contact faces 41a and 41b is weakened. At the same time, by the generated magnetic force between the opposing faces 22a and 41c, the moving unit 20 is held stationary on the stationary baseplate 10, and the moving unit 40 is displaced by a prescribed stroke in the opposite direction. Next, by letting the current flow so that the magnetic flux (not illustrated) flows in the direction opposite to the direction of FIG. 2b and FIG. 3b, the moving unit 40 is held stationary on the baseplate 10, and the moving unit 20 is displaced by the prescribed stroke in the opposite direction to complete the motion of one cycle. Similarly, by alternately letting the current flow through the electromagnetic coils 30 and 32, the moving units 20 and 40 are displaced in the opposite direction continuously.

Figure 13A:
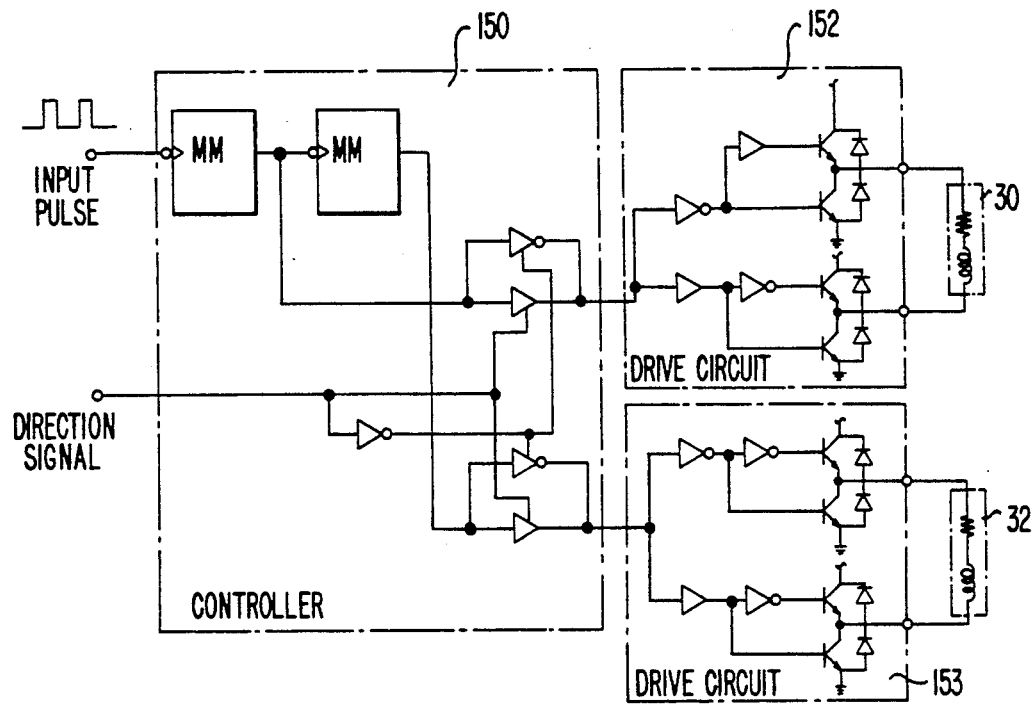
FIG. 13a is a circuit block for a step linear actuator according to the present invention.
Figure 13B:
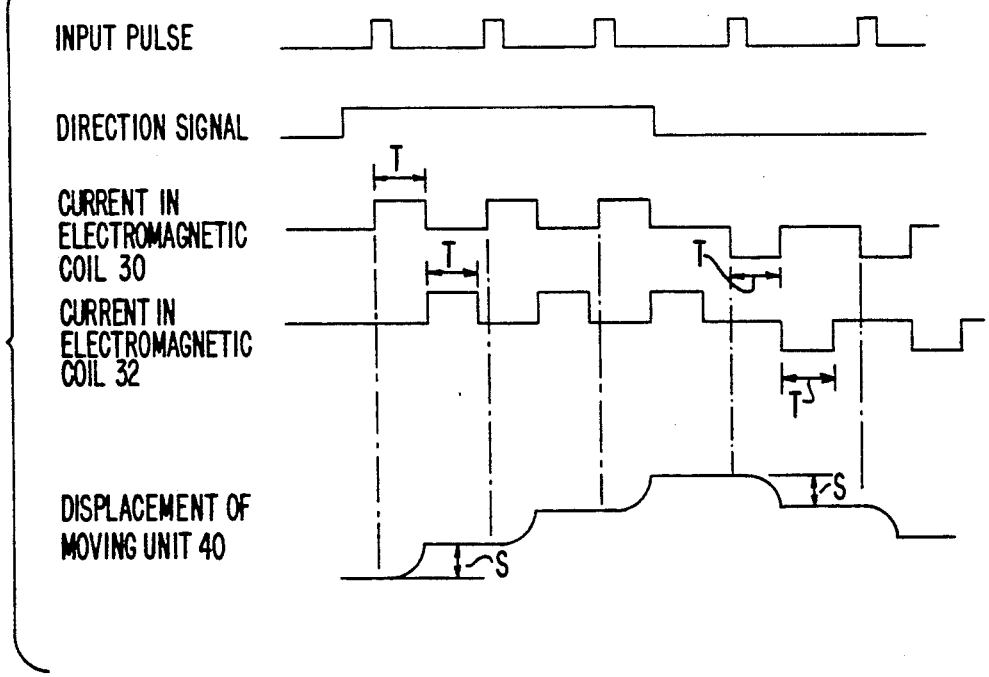
FIG. 13b is a view illustrating a motion of a step linear actuator according to the present invention.

FIG. 13a is a block diagram of a drive circuit for letting the current flow through the above electromagnetic coils 30 and 32, and FIG. 13b shows the relationship between the input pulse and the moving unit 40.

When an input pulse and a direction signal in the direction of advance are inputted to a controller 150 which has a function of a normal multivibrator and a function of changeover of a signal, a current pulse having a pulse width T is selectively outputted to the electromagnetic coils 30 and 32 from drive circuits 152 and 153 which have the function of letting the current flow through the electromagnetic coils 30 and 32 in both directions accordingly. According to said output, the moving units 20 and 40 respectively perform step motions stepwise in proportion to the input pulse by the distance s while changing the holding position alternately accompanied with the delay time by inertia to the current pulse. Similarly, by the changeover of the direction signal, they perform the step motion by the distance s in the opposite direction.

As described above, in this embodiment, there is provided a linear actuator in which, by alternately letting the current flow through a pair of electromagnetic coils which are the magnetic drive means and varying the direction and amount of current flowing, the holding force of each moving unit is selectively controlled to perform the step motions in b-directions. Accordingly, as it has a construction to house all the drive systems necessary for the step motion in the actuator without necessitating a special rail for the traveling path, it is possible to realize a simple construction having as a whole a small number of parts. Moreover, as no high precision is required for the whole traveling path and the suspension is simplified, it is rich in productivity.

Figure 4:
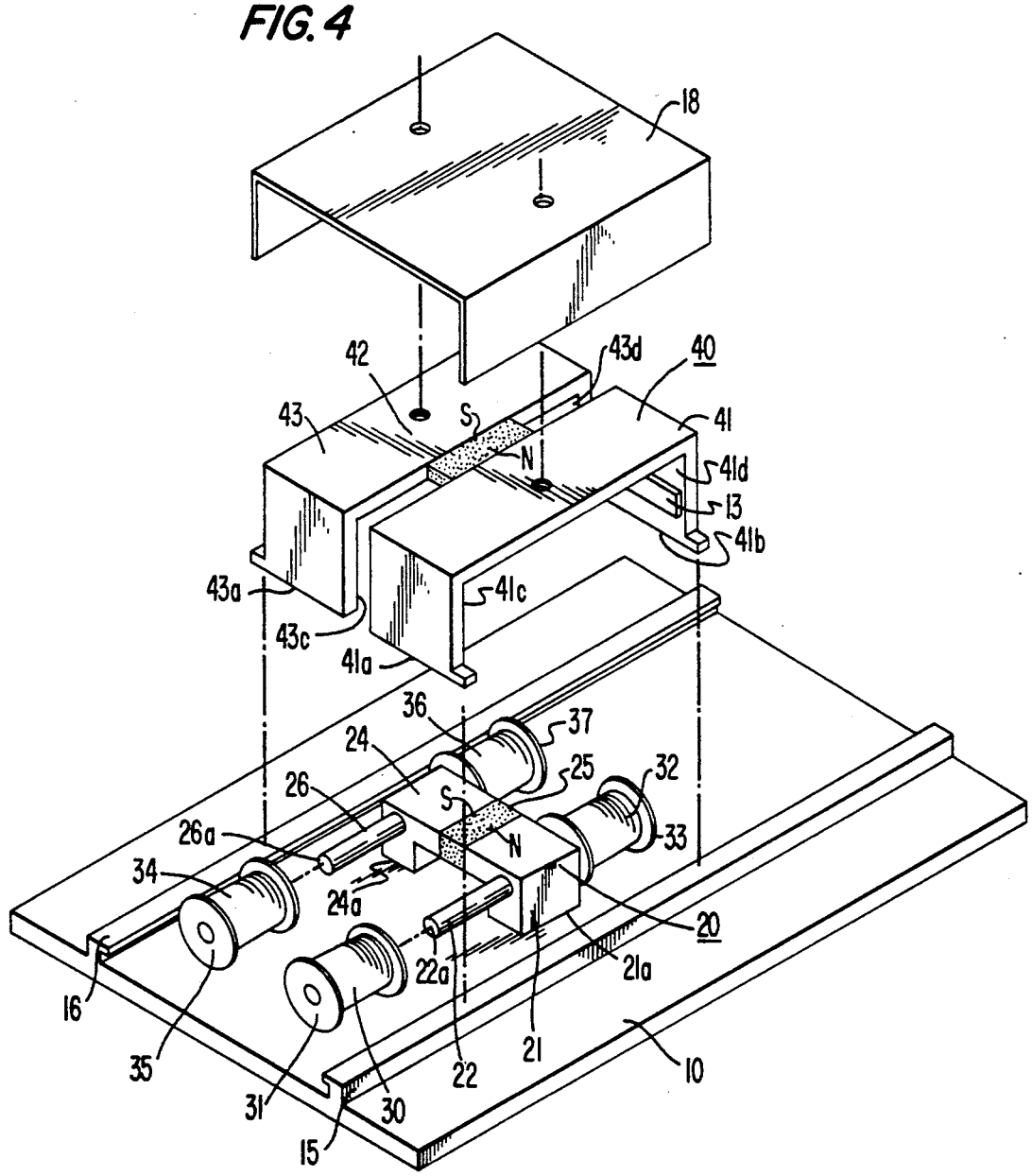
FIG. 4 is a disassembled perrspective view of a step linear actuator according to a second embodiment of the present invention.

FIG. 4 shows a second embodiment of the present invention. The step linear actuator of this embodiment similarly, comprises a stationary baseplate 10 and a pair of moving units 20 and 40 which are in contact with said baseplate and are relatively freely displaceable at a prescribed stroke in the direction of advance with respect to each other. The moving unit 20 has yokes 21 and 24 which are in contact with the stationary baseplate 10 in a positional relationship of crossing at right angles therewith and have contact faces 21a and 24a, and a permanent magnet 25 whose two end faces of different magnetic poles are clamped between the yokes 21 and 24 in contact with the stationary baseplate 10 to constitute a magnetic coupling means. A magnetic flux path is formed between the stationary baseplate 10 and each of the yoke 21 and 24, and the moving unit is magnetically coupled with the stationary baseplate 10.

On the other hand, the moving unit 40 has one-side opened square shaped yokes 41 and 43 having the contact faces 41a and 41b which are in contact with the stationary baseplate 10, and a permanent magnet 42 having the different magnetic poles between said yokes 41 and 43 and the two end faces are clamped to constitute a magnetic coupling means. Similarly, a magnetic flux path is formed between the stationary baseplate 10 and each of the yokes 41 and 43 and are magnetically coupled with the baseplate 10. With respect to the direction of magnetization of the permanent magnets 25 and 42, magnetization is effected in the same direction so that the flow of the magnetic fluxes through the magnetic flux paths in the moving units 20 and 40 is in the same direction.

Between the moving units 20 and 40, there are provided, to the respective yokes 21 and 24, a pair of yokes 22 and 23 each having a square section projecting in parallel with the stationary baseplate 10 in bi-directions respectively along the direction of advance and the other pair of yokes 26 and 27. A pair of the inner faces 41c and 41d of the yoke 41 which are vertically positioned to the stationary baseplate 10 of the yoke 41 are opposed to the yoke end faces 22a and 23a of the moving unit 20 and the inner faces 43c and 43d of the yoke 43 to the yoke end faces 26a and 27a, through a slight gap, constituting the respective opposing faces. On the other hand, on the pair of yokes 22 and 23 and the other pair of yokes 26 and 27 there are fitted a pair of electromagnetic coils 30 and 32 wound on the coil bobbins 31 and 33 and 35 and 37 and the other pair of electromagnetic coils 34 and 36, respectively. With the electromagnetic coils 30 and 32 utilized respectively as sources of magnetomotive forces, for example, assuming the electro-magnetic coil 30 to be a source of a magnetomotive force, a magnetic flux path is formed so as to let flow a constant magnetic flux to the yoke 41, contact faces 41a, 41b, stationary baseplate 10, contact face 21a, and yoke 21 through the yoke end face 22a. By the magnetic flux, an electromagnetic force is generated between the resepctive opposing faces 22a and 41c and between the opposing faces 23a and 41d, and the moving units 20 and 40 are respectively displaced in the direction of mutual attraction. A similar magnetic flux path is also formed by the electromagnetic coils 34 and 36.

The guide member at the stationary baseplate 10 is the same as in the first embodiment.

The motion of the step linear actuator constituted as above is basically the same as in the first embodiment. In the case of driving in the direction of advance, firstly in order to have the moving unit 40 held by the stationary baseplate 10 and the other moving unit 20 displaced by a prescribed stroke, current is let flow simultaneously in the respectively different directions through the pair of electromagnetic coils 30 and 34 disposed in parallel so as to form N pole on the yoke end face 22a and S pole on the yoke end face 26a. Then, current is let flow similarly through the other pair of electromagnetic coils 32 and 36 so that S pole is formed on the yoke end face 23a and N pole on the yoke end face 27a, by which the moving unit 20 is held reversely, and the moving unit 40 is displaced by a prescribed stroke to complete the motions of one cycle. By letting the current flow through the two units of a pair of electromagnetic coils alternately, the moving units 20 and 40 can perform continuous stepping motions on the stationary baseplate 10.

As this embodiment has a construction to make it easy to overlap the magnetic fluxes of the pair of electromagnetic coils 30 and 34 and 32 and 36 against the magnetic fluxes by the magnetic coupling means of the stationary baseplate 10 and the moving units 20 and 40, it is possible to control selectively and certainly the contact forces of the moving units 20 and 40 to the stationary baseplate 10.

Figure 5A:
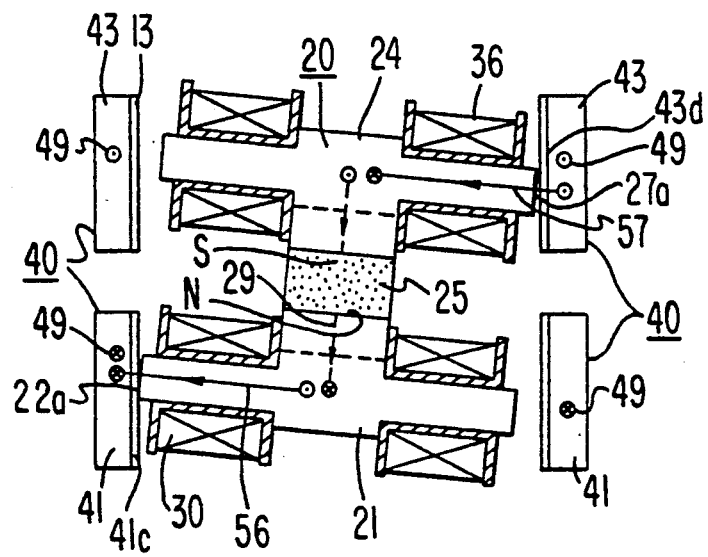
FIG. 5a and FIG. 5b are each side sectional view of FIG. 4.
Figure 5B:
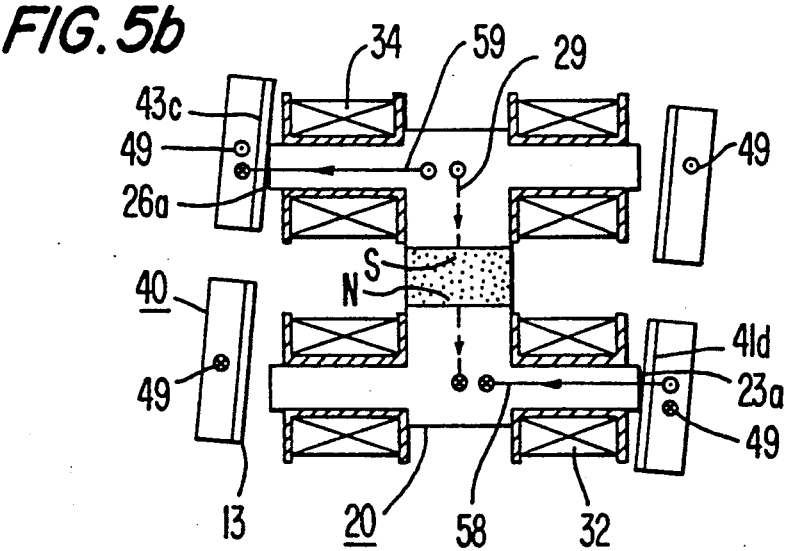

Also, according to this embodiment, by the combination method of the electromagnetic coils 30 and 32 and 34 and 36, besides the linear motion, a rotary motion centering on the permanent magnets 25 and 42 as shown in FIG. 5a and FIG. 5b can be performed. As shown in FIG. 5a, the electromagnetic coils 30 and 36 are symmetrically arranged so as to cross at the center of the permanent magnet 25 of the moving unit 20, through which current is let flow so that the magnetic fluxes 56 and 57 are led in the direction of solid line in the drawing so that the contact force is decreased at the contact faces 21a and 24a and the contact force is increased at the contact faces 41a and 41b, by which the moving unit 40 is held stationary on the baseplate 10, and the moving unit 20 is rotationally displaced by the clockwise rotary moment by the electromagnetic force which acts between the opposing faces 41c and 22a and the opposing faces 43d and 27a to assume the positional relation of FIG. 5a. Next, by letting the current flow through the pair of electromagnetic coils 32 and 34 so that the magnetic fluxes 58 and 59 flow in the direction of the dash line in arrow mark; similarly, the moving unit 20 is held on the stationary baseplate 10, and the moving unit 40 is rotationally displaced by the step angle determined by the effective gap between the opposing faces and the distance from the permanent magnets 25 and 42 to each opposing face by the moment of the electromagnetic forces acting on the opposing faces 41d and 23a and 26a and 43c, by which the motions of one cycle are completed.

Accordingly, in the construction of the present embodiment, by a simple construction, by the combination of the two pairs of electromagnetic coils, each of the moving units 20 and 40 is displaced while being self-held in an optional direction on the stationary baseplate 10.

Figure 6:
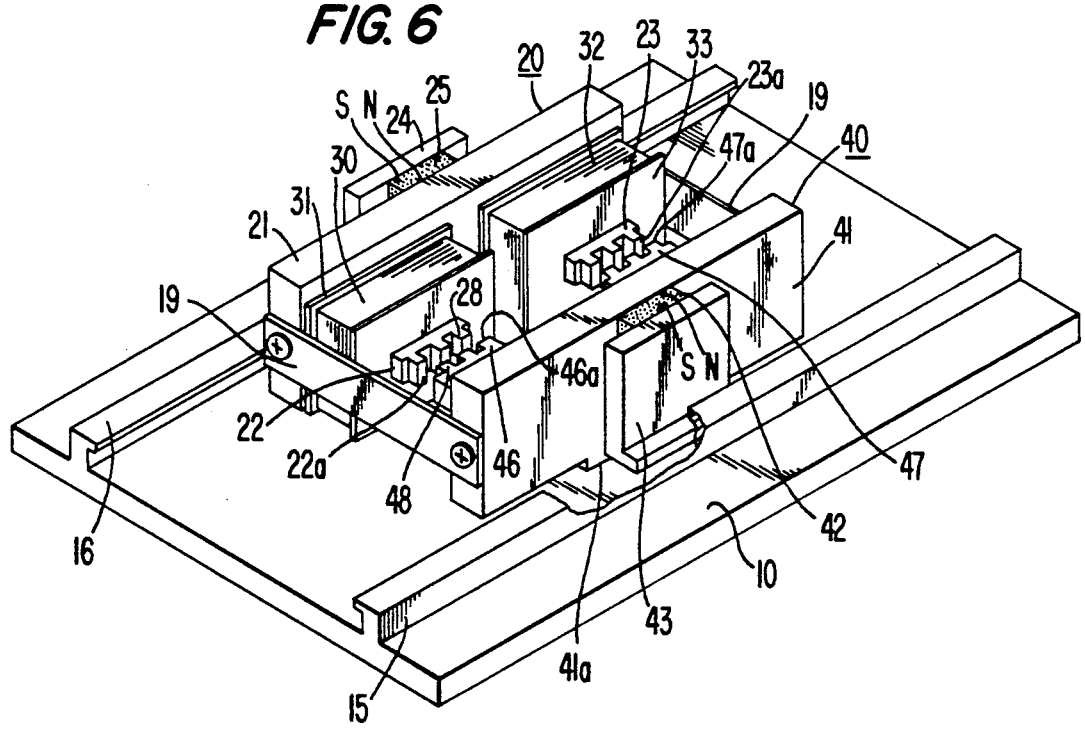
FIG. 6 is a disassembled perspective view of a step linear actuator according to a third embodiment of the present invention.
Figure 7:
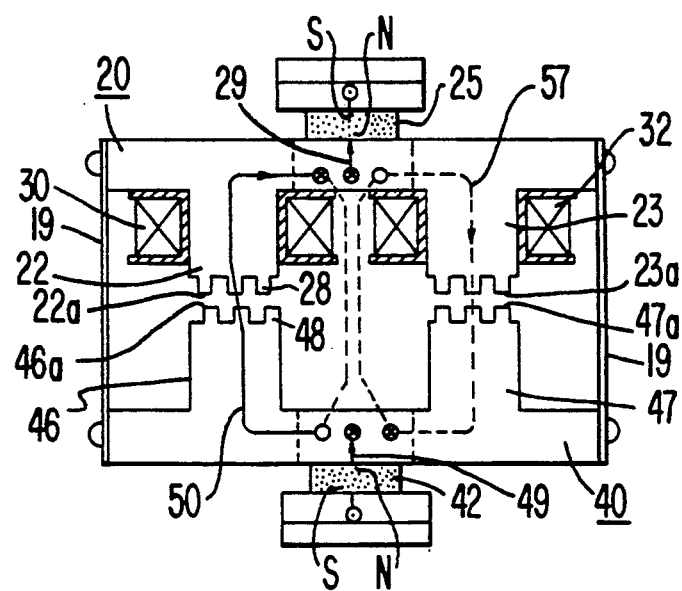
FIG. 7 is a side sectional view of FIG. 6.

FIG. 6 and FIG. 7 show a third embodiment. This embodiment also comprises a pair of moving units 20 and 40 which are in contact with the stationary baseplate 10 and are freely relatively displaceable by a prescribed stroke in the direction of advance. The moving units 20 and 40 are in contact with the stationary baseplate 10 at the contact faces 21a and 41a, and are accompanied with the yoke 21 and 41 arranged in parallel with the direction of advance, and the yokes 24 and 43 having a certain gap with the stationary baseplate 10 at the respective end faces nearly at the central parts of said yokes 21 and 41, and permanent magnets 25 and 42 which constitute the magnetic coupling members to form respectively magnetic coupling with the stationary baseplate 10.

Between the moving units 20 and 40, there are provided two pairs of respective yokes 22 and 23 and 46 and 47 which respectively project in the direction crossing at right angles to the direction of advance and opposed to one another through a certain gap in both sides respectively to each of the contact faces 21a and 41a, coupled with the yokes 21 and 41. On the opposing faces 22a and 46a and 23a and 47a, a plurality of tooth-like magnetic pole teeth 28 and 48 having a constant pitch are formed. Either one of the pair of opposing faces 22a and 46a and the other pair of opposing faces 23a and 47a is constituted with ¼ pitch displacement of the pitch of the magnetic pole teeth 28 and 48, and the other opposing faces are opposed at the same pitch. On the pair of yokes 22 and 46 and the other pair of yokes 23 and 47, the electromagnetic coils 30 and 32 which are respectively the magnetic drive means, wound on the coil bobbins 31 and 32, are fitted. Magnetic flux paths are formed so that, with the electomagnetic coils 30 and 32 as sources of the respective magnetomotive forces, a constant magnetic flux is let through the gap between the opposing faces 22a and 46a, each of the yokes 21 and 41 and the stationary baseplate 10, or through the gap between the opposing faces 23a and 47a, each of the yokes 21 and 41 and the stationary baseplate 10.

Also, between the moving units 20 and 40, on both side faces of the yokes 21 and 41 thin metal plate-like gap holding members 19 are fitted so that a constant gap is formed between the opposing faces 22a and 46a and 23a and 47a. The moving units 20 and 40 are guided along the guide members 15 and 16 provided on the stationary baseplate 10 on the lower side faces of the other yokes 24, 43 and displaced in the linear direction.

The motion of the step linear actuator constructed as above is basically similar to that of the first embodiment. In case of the non-flow of current, the actuator is self-held to the stationary baseplate 10 by means of the magnetic coupling member. By letting the current flow through the electromagnetic coil 30 so that the magnetic flux 50 flows in the direction of the solid line as shown in FIG. 7, the magnetic flux 50 is overlapped with the magnetic fluxes 29 and 49 formed by the permanent magnets 25 and 42 at the contact faces 21a and 41a, by which the moving unit 20 is more firmly held to the stationary baseplate 10, while on the contrary the moving unit 40 becomes freely displaceable. Also, by the electromagnetic force formed between the opposing faces 22a and 46a, the moving unit 40 is relatively displaced from the condition in which the pitches of the magnetic pole teeth are displaced by ¼ pitch to the mutually opposing positions.

Next, by letting the current flow through the electromagnetic coil 32 so that the magnetic flux flows in the direction of the dash line as shown in FIG. 7, reversely the moving unit 40 is held to the stationary baseplate 10, and the moving unit 20 is relatively displaced from the condition in which the pitches of the magnetic pole teeth 28 and 48 are displaced by ¼ pitch in the direction of advance to the position of opposing the magnetic pole teeth 28 and 48 to complete the motion of one cycle. Similarly, by alternately letting the current flow through the electromagnetic coils 30 and 32, the moving units 20 and 40 are allowed to perform continuous step motions.

As described above, according to this embodiment, continuous linear motion can be realized by a slight relative displacement between the magnetic pole teeth of each yoke while the opposing faces are holding a certain gap. Accordingly, high precision members for the whole traveling path are not needed. By controlling only the opposing gaps in the actuator and the pitch precision of the magnetic pole teeth of the yoke, the prescribed stroke can be obtained a high precision. Also, no sound of collision between the yokes occurs. High reliability is obtained in durable life.

The gap holding member 19 is to keep a certain gap against the electromagnetic force formed between the yoke opposing faces 22a and 46a and between 23a and 47a. Besides those as described above, the guide members 15 and 16 provided on the stationary baseplate 10 may be constituted as parts of said gap holding member 19 to provide the same functions as above.

Figure 8:
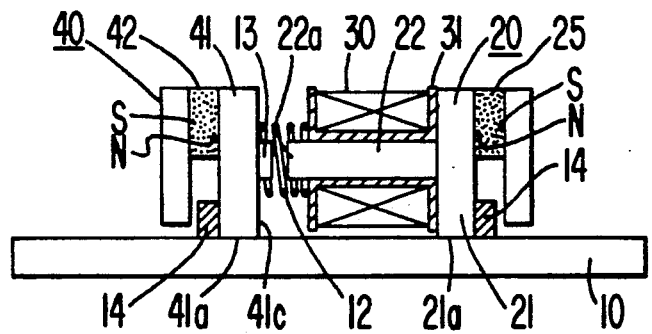
FIG. 8 is a disassembled perspective view of a step linear actuator according to a fourth embodiment of the present invention.

FIG. 8 shows a fourth embodiment. This embodiment similarly comprises a pair of moving units 20 and 40 which are in contact with the stationary baseplate 10 and freely relatively displaceable in the direction of advance by a prerscribed stroke. Of the one cycle motions of said moving unit, the means of always returning the relative positions to the initial positional relation is performed by a spring member instead of the former use of an electromagnetic coil.

The moving units 20 and 40 have the yokes 21 and 41 with arrangements of the permanent magnets 25 and 42 on the sides and accompanied respectively with the contact faces 21a and 41a on the stationary baseplate 10, as described above. They are magnetically coupled on the stationary baseplate 10.

Between the moving units 20 and 40, a yoke 22 opposing to the inner face 41c of the yoke 41 and projecting so as to constitute mutually opposing faces 22a and 41c is coupled to the yoke 21. To the said yoke 22 an electromagnetic coil 30 accompanied with a coil bobbin 31 is fitted. A magnetic flux path is formed so that a constant magnetic flux flows through the yoke 22, yoke 41, stationary baseplate 10 and yoke 21. By said magnetic flux the yokes are subjected to relative displacement.

Between the coil bobbins 31 of the moving units 20 and 40 and the opposing faces 41c, coaxially with the electromagnetic coil 30, a compression coil spring 12 is provided with its force exerted in the direction to separate the opposing faces 22a and 41c from each other. By the exerting force of said compression spring 12, a control member 41, which is resin molded in one-piece with the outer side of the yoke 21 and controls the widthwise direction of the yoke 41 along with the control of the displacement of the direction of advance of the moving unit 40, surrounds the yoke 41 and holds it in contact with it.

In the step actuator constructed as above, by letting the current flow through the electromagnetic coil 30, the moving unit 40 is held by the stationary baseplate 10 and the moving unit 20 becomes freely relatively displaceable by a prescribed stroke. By the electromagnetic force produced between the opposing faces 22a, 41c, the moving unit 20 is displaced stepwise only by an effective gap amount against the compression coil spring 12. Next, by intercepting the current flowing through the electromagnetic coil 30, with the holding force by the magnetic coupling member at the contact faces 21a and 41a and with the pressing force of the coil spring 12 accumulated by the displacement of the moving unit 20 during the flow of current, the moving units 20 and 40 are displaced in a mutually alienating direction to the position of the yoke 41 coming in contact with the control member 14. The moving units 20 and 40 are relatively displaced while being returned by the coil spring 12 against the mutual displacement by the electromagnetic coil 30.

The returned displacement amount varies depending on the trailing time of the electromagnetic coil 30, each mass of each moving unit, and the holding force at each of the contact faces 21a and 41a formed by the magnetic force.

By the above construction, the present embodiment makes it possible to perform bidirectional linear motions by a very simple construction comprising, for example, an electromagnetic coil 30 and a spring member 12.

Figure 9:
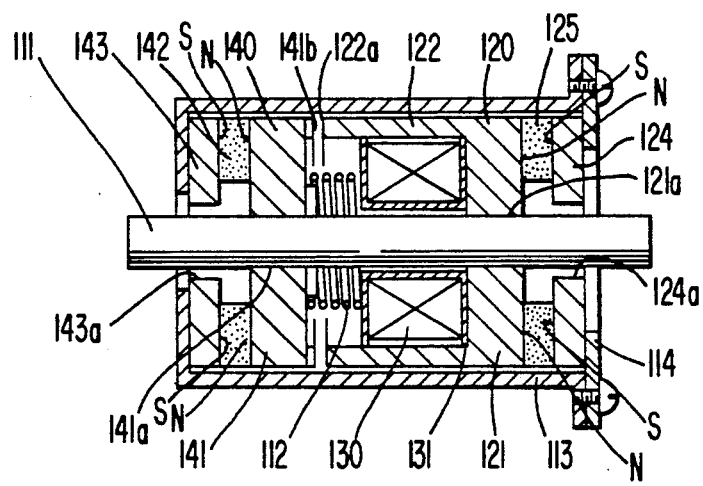
FIG. 9 is a side sectional view of a step linear actuator according to a fifth embodiment of the present invention.

FIG. 9 shows a fifth embodiment. In this embodiment, the stationary member is constructed by an axial member 111 which has a central axis in the direction of advance and is made of a magentic material, and comprises a pair of moving units 120 and 140 which are in contact with said axial member 111 and are freely relatively displaceable by a prescribed stroke with respect to each other in the direction of advance. The moving unit 120 has a disk yoke 121 which is coaxially disposed on the axial member 111 and carried in contact with the axial member 111 at the central opening and has a contact face 121a; a yoke 124 having a central opening end face 124a which is coaxially disposed via a certain gap on the axial member 111 similarly adjacent to said yoke 121; and a ring form permanent magnet 125 which is similarly coaxially disposed with the axial member 111 with its two end faces having different magnetic poles clamped by said yokes 121, 124. A magnetic flux path is formed so that, with said permanent magnet 125 utilized as a source of a magnetomotive force, a certain magnetic flux is let flow through the yoke 121, contact face 121a, axial member 111, gap between the axial member 111 and the yoke end face 124a, and yoke 124.

On the other hand, the moving unit 140 has a yoke 141 which is disposed coaxially with the axial member 111 alienated from the yoke 121 and has the similar construction as the moving unit 120, a yoke contact face 141a, a yoke 143 and a permanent magnet 142. With said permanent magnet 142 utilized as a source of a magnetomotive force, a magnetic flux path is formed between the axial member 111 and the moving unit 140. The permanent magnets 125 and 142 are magnetized in the same direction so that the directions of magnetization of the magnetic fluxes become constant at the contact faces 121a, 141a. Each of the moving units 120 and 140 is magnetically coupled to the axial member 111 by means of the magnetic coupling member.

Between the moving units 120 and 140, coupled with the yoke 121 of the moving unit 120, a cylindrical yoke 122 is disposed coaxially with the axial member 111, and its end face 122a is opposed to the inner side face 141b of the yoke 141 through a slight gap to constitute a pair of opposing faces to the moving units 120 and 140. On the inner side of the yoke 122 there is fitted an electromagnetic coil 130 which has a central opening and is disposed with a slight gap with the axial member 111 and is accompanied with a coil bobbin 131. With said electromagnetic coil 130 utilized as a source of a magnetomotive force, a magnetic flux path is formed between the yoke 141, axial member 111, contact face 121a and yoke 121 through the gap between the yoke 122a and the side face 141b. By said magnetic flux, an electromagnetic force is generated between the opposing faces 122a and 141b to cause relative displacement of the moving units 120 and 140 in the mutually attracting direction on the axial member 111. Further, between the coil bobbin 131 and the side face of the yoke 141b, a compression coil 112 is provided coaxially with the axial member 111 so as to exert force to the yoke 121 and 141 in the mutually alienating direction. On the outer peripheral part of the moving units 120 and 140, a casing 113 on the cup for controlling the displacement of the moving unit 120 on the axial member 111 and a disk member 114 which is engaged with said casing 113 for controlling the displacement of the yoke 124 of the moving unit 120 in the axial direction are fitted.

In this embodiment, the contact faces 121a and 141a of the yokes 121 and 141 are used also as the guide members.

In the step actuator constituted as above, by letting the current flow through the electromagnetic coil 130, the moving unit 140 is held on the stationary baseplate 111 and the moving unit 120 comes to have a condition freely relatively displaceable by the specified stroke, and, by the electromagnetic force produced between the opposing faces 122a and 141b, the moving unit 120 is displaced stepwise only by an effective gap amount against the compression coil spring 112. Next, by intercepting the current flowing through the electromagnetic coil 130, by means of the holding force by the magnetic coupling member at the contact faces 121a and 141a and the pressing force of the coil spring 112 accumulated by the displacement of the moving unit 120 at the time of the current flow, the moving units 120 and 140 are displaced in the mutually alienating direction to the position in which the yoke 124 is in contact with the disk member 114, by which the moving units 120 and 140 are mutually relatively displaced.

By the above construction, according to the present embodiment, by the co-use of the axial member with the guide member as a stationary member, it is possible to perform linear motions in two directions with one electromagnetic coil 130 and a spring member 112, so that a linear actuator having very simple construction can be realized.

Figure 10:
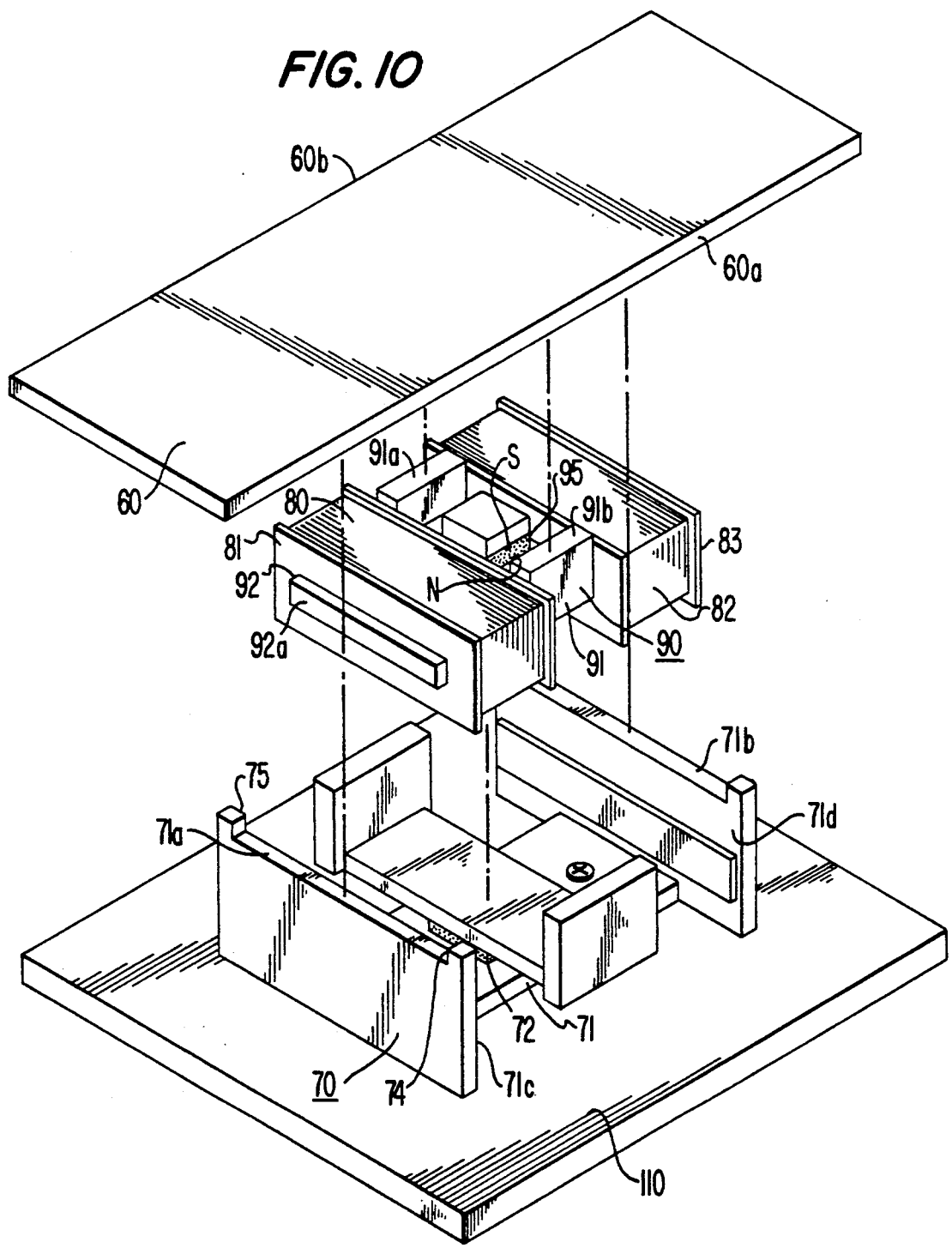
FIG. 10 is a disassembled perspective view of a step linear actuator according to a sixth embodiment of the present invention.
Figure 11:
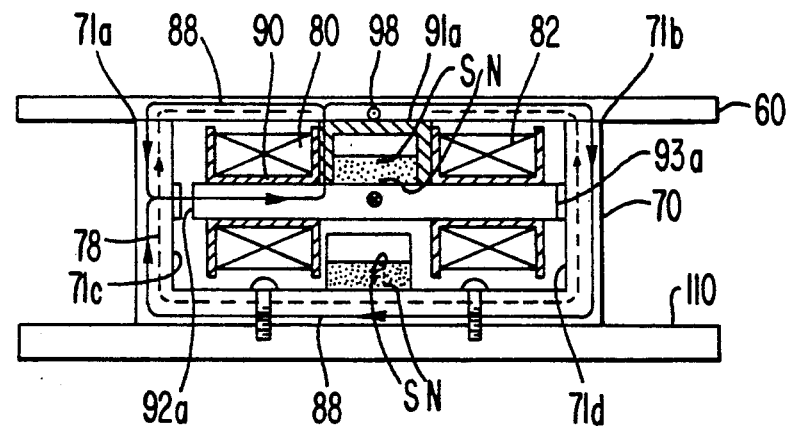
FIG. 11 is a side sectional view of FIG. 10.

FIG. 10 and FIG. 11 show a sixth embodiment, which has basically the same construction as the first embodiment. Either one of a pair of moving units 20 and 40 which are freely slidably supported by the stationary baseplate in the first embodiment is fixed to the apparatus body to which a linear actuator is fitted, and the other moving unit and the above stationary baseplate 10 are made relatively displaceable in the prescribed stroke.

In FIG. 10, on the baseplate 110 of the apparatus body, a stationary member 70 which is similar in structure to the moving unit in FIG. 1 is fixed at the lower face of the control part of the yoke 71. By a pair of contact faces 71a and 71b disposed in the direction of advance thereof, the movable baseplate 60 comprising a magnetic material is freely relatively displaceably carried. Between the contact faces 71a and 71b of said stationary member 70, a moving unit 90 which has the similar construction as that of the moving unit 20 of FIG. 1 and has a yoke 91 is disposed in contact with the movable plate 60 at its contact faces 91a and 91b. To the respective members of the stationary member 70 and the moving unit 90, the permanent magnets 72 and 95 which are the magnetic coupling members are magnetically coupled to the movable plate 60 at the contact faces 71a and 71b and at the contact faces 91a and 91b, and they are held under magnetization so that the flow of the magnetic fluxes at that time comes to be in the same direction.

Between the stationary member 70 and the moving unit 90 there are disposed the yoke 92 and 93 projecting in parallel to the baseplate 110 from the yoke 91 respectively in two directions so as to constitute the opposing faces. To those yokes 92, 93 the electromagnetic coils 80, 82 wound on the coil bobbins 81 and 83, are fitted. When the electromagnetic coil 80 is used as a source of a magnetomotive force, a magnetic flux path is formed so that a constant magnetic flux flows through the yoke 92, opposing face 92a and the inner face 71c of the yoke, contact faces 71a and 71b, movable plate 60, contact faces 91a and 91b and yoke 91 to constitute a magnetic drive means together with the electromagnetic coils 80, 82.

On the upper two ends of the contact faces 71a and 71 of the stationary member 70, there are provided integrally therewith the guide members 74 and 75 to guide the two sides 60a and 60b of the movable plate 60, by which the movable plate 60 is freely movably displaced by a prescribed stroke along the direction of advance.

In the present embodiment constructed as above, the basic motion is similar to that of the first embodiment. During the non-flow of current, the movable plate 60 is self-held to the stationary member 70 by means of the magnetic coupling member, and the moving unit 90 is self-held to the said movable plate 60. By letting the current flow so that the magnetic flux 88 flows through the electromagnetic coil 80 in the direction of the solid line as shown in FIG. 10, the magnetic flux 88 overlaps the magnetic fluxes 78 and 98 by the magnetic coupling member, by which the contact force decreases at the contact faces 71a and 71b of the stationary member 70 and the contact force increases at the contact face 91a of the moving unit 90. By the electromagnetic force produced between the opposing faces 71c and 91a, the movable plate 60, while being held by the moving unit 90, is displaced together with the moving unit 90 in the direction of decreasing the gap between the opposing faces 71c and 92a of the stationary member 70.

Then, by intercepting the current flowing through the electromagnetic coil 80 and letting the current flow through the electromagnetic coil 82, contrary to the abovementioned state, the contact force increases at the contact faces 71a and 71b of the stationary member 70 and the contact force decreases at the contact faces 91a and 91b, and, by the electromagnetic force produced between the opposing faces 71d and 93a, with the movable unit 60 being in the condition of being held by the stationary member 70, only the moving unit 90 returns to the initial relative positional relationship as shown in FIG. 10 to complete the motions of one cycle. Similarly, by alternately letting the current flow through the electromagnetic coils 80 and 82, the movable plate 60 is allowed to perform step motion continuously. Further, by changing the direction of the current flow through the electromagnetic coils 80 and 82, the movable plate 60 can be driven in the opposite direction.

The above electromagnetic coils 80 and 82 have the similar functions even when disposed on the stationary member 70 side.

As described above, according to this embodiment, step motion can be performed if the movable plate 60 comprises a baseplate made of a magnetic material or made by integrally forming the magnetic material, so that it is possible to realize a linear actuator of a simple construction having the small number of parts. Moreover, it is easy to use the above movable plate also as the member of the apparatus body to which the linear actuator is fitted, so that the simplification as the whole apparatus can also be attained.

Further, as the magnetic drive means is fixed to the side of the stationary member 70 or the moving unit 90, there is no shift accompanied with wiring, because of which it is possible to elevate the reliability of the apparatus, and, due to the small portions of which precision is required against the necessary stroke, the present embodiment has superiority in the property of assembling.

In the foregoing embodiments, there have been given as examples the stationary plate 10 as the stationary member and the movable plate 60 as the movable member. However, any member comprising a magnetic material and having linearity, for example, of axial shape having a center axis in the direction of advance, may perform the similar function. Alternatively, replacement of the permanent magnet of the magnetic coupling member by excitation by an electromagnetic coil may also be effective for performing the similar function.

Further, the shapes of the members shown in the present embodiments, e.g., stationary member, moving units and guide members, are not to be limited.

FIG. 12 shows an example of application of the present invention which is used for an optical pickup traverse system of an optical disk drive for reading out and reproducing, with an optical pickup 102 using a semiconductor laser ray, recorded information from a disk recording medium 101 having an information track recorded spirally or concentrically, in which the step linear actuator 100 is carried in contact with the stationary baseplate 110 which is a base of the disk drive, and the optical pickup 102 is carried on the actuator 100.

The recording medium 101 is driven in rotation by a spindle motor 103. On the stationary baseplate 110 a groove 105 is provided along the radial direction of the recording medium. A guide pin 106 for guiding, protruding from the lower part of the linear actuator 100, is disposed in freely fitting condition on said groove 105.

The linear actuator 100 is driven, guided by the groove 105, while correcting the track error of the optical pickup 102 against the recording medium 101 in the radial direction of the recording medium 101.

What is claimed is:

1. A linear actuator comprising:
   a stationary member comprising a magnetic material;
   first and second moving units each being in contact with said stationary member and having a magnetic coupling means for generating a magnetic contact force to said stationary member and an opposing face, the opposing face of said first moving unit and the opposing face of said second moving unit being opposed to each other through a gap therebetween; and
   magnetic drive means cooperative with said first and second moving units for generating magnetic forces to magnetically control the contact force of each of said first and second moving units generated by said magnetic coupling means and to cause a relative displacement of said first and second moving units to each other.

2. A linear actuator according to claim 1, wherein said magnetic coupling means of each of said first and second moving units comprises:
   a yoke member having a contact portion which is in contact with said stationary member; and
   a magnetic flux generating means held on said yoke member for generating a magnetic flux passing through said contact portion so that the direction of the magnetic flux passing through the contact portion of the yoke member of said first moving unit is the same as that passing through the contact portion of the yoke member of said second moving unit.

3. A linear actuator according to claim 2, wherein said magnetic flux generating means comprises a permanent magnet.

4. A linear actuator according to claim 2, wherein said yoke member has an end face opposing said stationary member through a gap therebetween so that said yoke member, said stationary member and said gap between said end face of said yoke member and said stationary member form a magnetic flux path for passing therethrough the magnetic flux generated by said magnetic flux generating means.

5. A linear actuator according to claim 2, wherein each of said first and second moving units has a yoke member connected to said yoke member of said magnetic coupling means and forming said opposing face at one end thereof.

6. A linear actuator according to claim 5, wherein said magnetic drive means comprises an electromagnetic coil mounted on said yoke member forming said opposing face of at least one of said first and second moving units for generating a magnetic flux which causes a magnetic force between said yoke member of said magnetic coupling means of each of said first and second moving units and said stationary member at said contact portion of said yoke member of said magnetic coupling means and a magnetic force between said opposing faces of said first and second moving units.

7. A linear actuator according to claim 2, wherein each of said first and second moving units has a yoke member connected to said yoke member of said magnetic coupling means and forming said opposing face at each of opposite ends thereof, and
  wherein said magnetic drive means comprises a pair of electromagnetic coils mounted on said yoke member forming said opposing face of at least one of said first and second moving units, each of the pair of electromagnetic coils generating a magnetic flux which causes a magnetic force between said yoke member of said magnetic coupling means of each of said first and second moving units and said stationary member at said contact portion of said yoke member of said magnetic coupling means and a magnetic force between corresponding said opposing faces of said first and second moving units.

8. A linear actuator according to claim 2, wherein each of said first and second moving units has a yoke member connected to said yoke member of said magnetic coupling means and forming said opposing face at an end thereof, and
  wherein said magnetic drive means comprises:
    an electromagnetic coil mounted on said yoke member forming said opposing face of at least one of said first and second moving units for generating a magnetic attractive force between the opposing faces of said first and second moving units; and
    an urging means for urging said first and second moving units in directions in which the opposing faces of said first and second moving units are apart from each other.

9. A linear actuator according to claim 8, wherein said urging means comprises a compression spring connected at one end to said yoke member forming said opposing face of said first moving unit and at the other end to that of said second moving unit.

10. A linear actuator according to claim 8, wherein at least one of said first and second moving units has a means for restricting the relative displacement of said first and second moving units within a predetermined range.

11. A linear actuator according to claim 1, wherein each of said first and second moving units displaces relative to the other in a direction of changing the length of the gap between said opposing face of said first moving unit and said opposing face of said second moving unit.

12. A linear actuator according to claim 11, wherein a spacer made of a non-magnetic material is provided on said opposing face of at least one of said first and second moving units.

13. A linear actuator according to claim 1, wherein each of said first and second moving units displaces relative to the other in a direction perpendicular to the opposing direction on the opposing faces of said first and second moving units while keeping constant the length of said gap between said opposing faces.

14. A linear actuator according to claim 13, wherein said opposing face of one of said first and second moving units comprises a first plurality of tooth-shaped faces aligned at a constant pitch, and said opposing face of the other of said first and second moving units comprises a second plurality of tooth-shaped faces aligned at the same pitch as said constant pitch and shifted by a half pitch from the first plurality of tooth-shaped faces.

15. A linear actuator according to claim 1, wherein said stationary member comprises a plate made of a magnetic material.

16. A linear actuator according to claim 1, wherein said stationary member has a guide member for guiding said first and second moving units.

17. A linear actuator according to claim 16, wherein said guide member has a surface for preventing said first and second moving units from being released from said stationary member and a surface for guiding said first and second moving units.

18. A linear actuator according to claim 1, wherein said stationary member has a guide means comprising a groove formed in said stationary member, and a pair of guide pins fitted slidably into said groove and respectively fixed to said first and second moving units.

19. A linear actuator according to claim 1, wherein said stationary member has a means for maintaining said gap.

20. A linear actuator according to claim 1, wherein said stationary member comprises a shaft-like member having a center axis in a direction of the relative displacement of said first and second moving units.

21. A linear actuator according to claim 20, wherein said first and second moving units are mounted coaxially with said center axis on said shaft-like member.

22. A linear actuator according to claim 1, wherein said magnetic coupling means of each of said first and second moving units comprises:
  a pair of first and second yoke members each having a contact portion which is in contact with said stationary member; and
  a permanent magnet which is supported at end surfaces thereof having different magnetic poles from each other by said first and second yoke members respectively for generating a magnetic flux passing through said contact portion of each of said first and second yoke members, and
  wherein said magnetic drive means comprises:
  a pair of third and fourth yoke members provided in each of said first and second moving units and respectively connected to said first and second yoke members in the corresponding moving unit, each of said third and fourth yoke members forming said opposing face at an end face thereof; and
  a pair of electromagnetic coils which are respectively mounted on said third and fourth yoke members of at least one of said first and second moving units for generating said magnetic forces of said magnetic drive means.

23. A linear actuator comprising:
  a stationary member;
  a movable member which is made of a magnetic material and is in contact with said stationary member, said movable member being movable with respect to said stationary member;
  a movable unit which is in contact with said movable member and is movable relative to said movable member and having an opposing face opposing to said stationary member through a gap therebetween to be movable relative to said stationary member within a specified stroke;
  a magnetic coupling means provided on both said stationary member and said movable unit applying a magnetic contact force to said movable member; and
  a magnetic drive means cooperating with said stationary member and said movable unit for generating a magnetic force at said opposing face of said movable unit to magnetically control the magnetic contact force of each of said stationary member and said movable member generated by said magnetic coupling means so as to cause a reciprocal movement of said moving unit relative to said stationary member with said specified stroke, thereby moving said movable member stepwise relative to said stationary member.

* * * * *